Sept. 18, 1962     W. B. McKNIGHT ETAL     3,054,899
OPTICAL SCANNING SYSTEM
Filed June 24, 1960
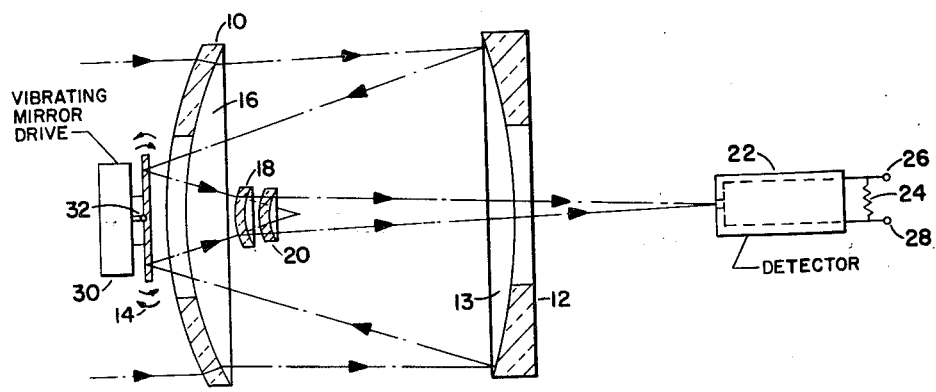
William B. McKnight
Dale E. Holter,
            INVENTORS.
BY
ATTORNEYS.

3,054,899
OPTICAL SCANNING SYSTEM

William B. McKnight, Somerville, and Dale E. Holter, Albertsville, Ala., assignors to the United States of America as represented by the Secretary of the Army
Filed June 24, 1960, Ser. No. 38,675
3 Claims. (Cl. 250—83.3)
(Granted under Title 35, U.S. Code (1952), sec. 266)

The invention described herein may be manufactured and used by or for the Government for governmental purposes without the payment of any royalty thereon.

This invention relates generally to optical scanning systems, and more particularly to infrared optical scanning systems.

It is the object of this invention to provide an improved optical system having characteristics especially suited for use with scanning mirrors of various types.

It is a further object of this invention to provide an optical system particularly adapted to utilize a flat mirror as a scanning element.

This invention will be better understood by consideration of the following specification and accompanying drawing in which the single FIGURE is a diagrammatic view of an embodiment of the invention with optical elements shown in section as cut thru a diameter.

Referring to the drawing, a corrective refractive lens or dome 10, which is of the type known as a Bowers system corrective lens, is placed at the forefront of the optical system to intercept received radiation and cast it on concave spherical mirror 12. The lens 10 corrects for aberration produced by spherical mirror 12 which mirror is coated on its concave surface 13 with a highly reflective substance. Spherical mirror 12 reflects to vibrating or oscillating flat mirror 14, either directly or through a center hole 16 in corrective lens 10. The flat mirror 14 reflects to lenses 18 and 20, these two lenses comprising a focusing system. Lens 18, performing a collimating function, is a lens having aspherical surfaces of curvature, while lens 20 is a generally spherical lens selected to provide the desired resolution and focus of collimated radiation. Radiation is focused by lens 20 thru a center hole in spherical mirror 12 to radiation detector or transducer 22 which is sensitive to infrared radiation and positioned symmetrically with respect to this center hole. The electrical output of transducer 22 appears across load resistor 24, and output terminals 26 and 28. In order to provide a low loss transmission of infrared, lenses 18 and 20 are made of a substance having good transmissivity in the infrared region, such as arsenic trisulphide.

Mirror 14 is driven or vibrated, about perpendicular mirror plane axes to produce a rectilinear scan or vibrated about a single plane axis to produce a lineal scan of the filed of view of mirror 12. The latter is illustrated in the drawing in which mirror 14 is driven by vibrating mirror drive 30 about axis 32.

The principles of the invention explained in connection with a specific exemplification thereof will suggest many other applications and modifications of the same. It is accordingly desired that, in construing the breadth of the appended claims, they shall not be limited to the specific details shown and described in connection with exemplification thereof. Therefore what is desired to be secured by Letters Patent of the United States is:

1. An optical scanning system comprising a corrective refractive lens, a concave spherical mirror, a plane mirror, a collimating lens, a focusing lens, and a radiation transducer having their centers disposed on the optical axis of said system and in a plane perpendicular thereto, said refractive lens positioned to intercept incident radiation and to transmit said radiation on to said concave mirror, said plane mirror positioned to receive radiation reflected by said concave mirror and to reflect said radiation through a central opening in said refractive lens on to said collimating lens, means attached to said plane mirror for vibrating said mirror about an axis lying in the plane perpendicular to said optical axis, said radiation passing through said collimating and said focusing lens and through a central opening in said concave mirror on to a light sensitive region of an infrared radiation transducer for providing an electrical output corresponding to said radiation.

2. The scanning system as set forth in claim 1 in which said collimating lens has aspherical surfaces of curvature and said focusing lens is a generally spherical lens designed to provide the desired resolution and focus of the radiation emitted by said collimating lens.

3. The scanning system as set forth in claim 2 in which said collimating lens and said focusing lens are made of a substance having a low transmission loss in the infrared region.

References Cited in the file of this patent
UNITED STATES PATENTS

| | | |
|---|---|---|
| 2,865,253 | Thieleus | Dec. 23, 1958 |
| 2,895,049 | Astheimer | July 14, 1959 |
| 2,959,678 | Jones | Nov. 8, 1960 |

FOREIGN PATENTS

| | | |
|---|---|---|
| 1,149,437 | France | Dec. 26, 1957 |